United States Patent
Sartori et al.

(10) Patent No.: US 7,400,856 B2
(45) Date of Patent: Jul. 15, 2008

(54) METHOD AND APPARATUS FOR RELAY FACILITATED COMMUNICATIONS

(75) Inventors: Philippe J. Sartori, Algonquin, IL (US); Kevin L. Baum, Rolling Meadows, IL (US); Brian K. Classon, Palatine, IL (US); Mark Cudak, McHenry, IL (US); Vijay Nangia, Schaumburg, IL (US); Eugene Visotsky, Skokie, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/654,227

(22) Filed: Sep. 3, 2003

(65) Prior Publication Data

US 2005/0048914 A1  Mar. 3, 2005

(51) Int. Cl.
*H04B 3/36* (2006.01)

(52) U.S. Cl. ............... 455/7; 455/9; 455/10; 455/11.1; 370/315

(58) Field of Classification Search ........... 455/7–11.1, 455/14–25, 504–506; 370/315, 316
See application file for complete search history.

(56) References Cited

U.S. PATENT DOCUMENTS

| | | | | |
|---|---|---|---|---|
| 5,633,876 A | * | 5/1997 | Dinkins ................ | 370/315 |
| 5,892,758 A | * | 4/1999 | Argyroudis ............ | 370/335 |
| 6,005,884 A | | 12/1999 | Cook et al. | |
| 6,132,306 A | * | 10/2000 | Trompower ............ | 455/11.1 |
| 6,353,728 B1 | * | 3/2002 | Fischer et al. ......... | 455/3.01 |
| 6,459,725 B1 | | 10/2002 | Baker et al. | |
| 6,501,955 B1 | * | 12/2002 | Durrant et al. ........ | 455/456.1 |
| 7,139,527 B2 | * | 11/2006 | Tamaki et al. ......... | 455/16 |
| 2001/0014586 A1 | * | 8/2001 | Nakatsugawa ......... | 455/13.1 |
| 2001/0031621 A1 | * | 10/2001 | Schmutz .............. | 455/7 |
| 2003/0220075 A1 | * | 11/2003 | Baker et al. .......... | 455/17 |
| 2004/0192204 A1 | * | 9/2004 | Periyalwar et al. ..... | 455/25 |

OTHER PUBLICATIONS

Gupta, Piyush and Kumar, P. R., "The Capacity of Wireless Networks", IEEE Transactions On Information Theory, vol. 46, No. 2, Mar. 2000, pp. 388-404.

Kepler, James F., Krauss, Thomas P., and Mukthavaram, Sandeep, "Delay Spread Measurements on a Wideband MIMO Channel at 3.7 GHz", © 2002 IEEE, pp. 2498-2502.

Wang, Raymond, Cox, Donald C., Viswanathan, Harish, and Mukherjee, Sayandev, "A First Step Toward Distributed Scheduling Policies in Cellular Ad Hoc Networks", © 2002 IEEE, pp. 8-12.

Zaruba G. et al.: "Bluetrees-Scatternet formation to enable Bluetooth-based ad-hoc networks", proc ICC 2001, vol. 1, pp. 273-277.

* cited by examiner

*Primary Examiner*—Edward Urban
*Assistant Examiner*—Raymond S. Dean

(57) ABSTRACT

Communications sourced by a remote unit (14) that is already within reception range of a base site (10) can nevertheless be further facilitated through allocation of one or more relay resources (15, 16). Such relay resources, properly employed, then serve to effectively increase the quality of service for the facilitated communication. This, in turn, can permit the use of, for example, increased data rates for communications from a relatively low power remote unit.

40 Claims, 7 Drawing Sheets

METHOD AND APPARATUS FOR RELAY FACILITATED COMMUNICATIONS

TECHNICAL FIELD

This invention relates generally to wireless communications and more particularly to the use of communication relays.

BACKGROUND

Wireless communication systems are known in the art. In many such systems remote communication units (at least some of which may be mobile) communicate with one another and/or with others via system infrastructure such as fixed-location transmitters and receivers. In general, wireless communication systems are characterized by a corresponding communication range (typically characterized by either or both of a transmission range and a reception range) beyond which the wireless communications capability of the system infrastructure cannot usefully extend.

Repeaters are also known in the art. Such devices typically serve to extend the communication range of a given communication system (by extending the transmission and/or reception range). Via this mechanism, for example, a relatively low power remote communication unit can effectively communicate with a relatively distant system receiver notwithstanding that the remote communication unit is otherwise out-of-range of the distant system receiver. Such repeaters often operate in an autonomous automatic mode and repeat whatever transmissions they successfully receive.

Unfortunately, despite various improvements to both systems and remote communication units, there remain times and circumstances when the transmissions of a communication unit that is within the communication range of a given communication system are nevertheless not received reliably at a given desired level of quality of service. Various causes exist for this result, including but not limited to shadow fading and other propagation issues. Performance requirements can also pose an impact. For example, as data transmission rates demands continue to increase (leading frequently to a corresponding increase in bandwidth), the ability of an otherwise in-range remote communication unit to successfully effect a desired level of service without a concurrent significant increase in transmission power usually becomes impaired.

BRIEF DESCRIPTION OF THE DRAWINGS

The above needs are at least partially met through provision of the method and apparatus for relay facilitated communications described in the following detailed description, particularly when studied in conjunction with the drawings, wherein.

Figure 1:
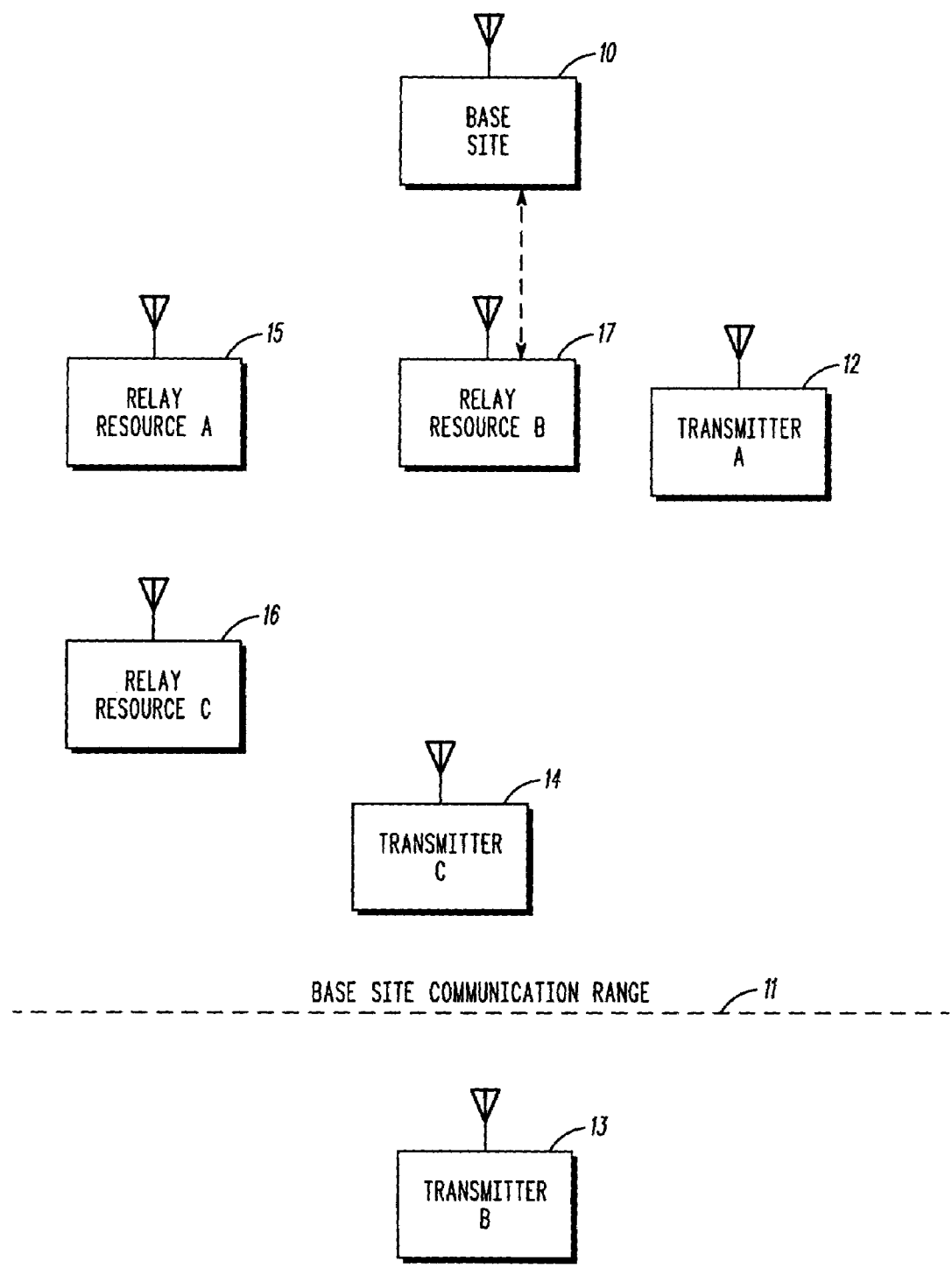
FIG. 1 comprises a diagrammatic system overview as configured in accordance with various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a base site determines a need to receive a wireless transmission from a transmitter that is presently within communications range of the base site and automatically determines whether to allocate a wireless relay resource to thereby at least attempt to increase a quality of service to support the wireless transmission from this transmitter. So configured, one or more relays can be automatically utilized when and as appropriate to support, for example, the use of relatively high data rates by the transmitter.

Such relays can be configured in any number of ways consistent with this approach. For example, a given relay can simply forward, automatically, all received communications (or at least those communications that are received with a least a predetermined degree of acceptable reception) and the base site can effect its determination by automatically determining whether to accept such automatically relayed transmissions. As another example, a given relay can relay received transmissions only upon receipt of an enabling instruction from the base site. In either of the above examples, the relay can effect a concurrent relayed transmission or can effect a store-and-forward operation by delaying the relayed transmission until a later (typically predetermined) time or opportunity.

Such relays can also be used in conjunction with an ARQ process such as a hybrid ARQ process. For example, a relay can store received transmissions from a given remote communication device and only relay a given transmission (or portion thereof) in response to an ARQ request or error indicator from the base site. As another example, the relay itself can further effect a significant part of the ARQ process by storing multiple transmissions of a given data package or message and then combining those stored results to permit a proper decoding of the data package/message. The latter can then be relayed to the base site.

These embodiments are also sufficiently flexible to permit other useful configurations. For example, a given base site can receive the relayed transmissions of one or more relays and utilize those relayed transmissions in combination with transmissions as are received by the base site from the remote communication unit to attempt to reconstruct an accurate version of the original transmission.

These and other embodiments as set forth herein are relatively simple to implement, cost effective, conservative of system resources, architecturally flexible, reliable, and serve well to permit, for example, the use of significantly increased data transmission rates by remote communication units without a corresponding attendant increase in power usage by the latter.

Referring now to FIG. 1, a wireless communication system will typically have at least one base site 10 transceiver (in this embodiment, for the sake of simplicity and clarity, the base site 10 is presumed to serve essentially all of the relevant infrastructure functions described herein; it will of course be understood by those skilled in the art that such functionality can be distributed and/or otherwise parsed over one or more other architectural elements of a given communication system and that the expression "base site" as used herein shall be understood to refer in general to any and all presently known or hereafter developed corresponding communication system infrastructure elements and components). This base site 10 serves, in part to source transmissions to remote units and to receive transmissions from such units.

As noted earlier, wireless communications are typically bounded by a communications range. In one example, the communication range is considered to be the set of all locations where a remote unit and the base site can establish a communication link with a data rate larger than a minimum predetermined data rate. For example, the minimum predetermined data rate can be the data rate necessary for a voice communication, or in another example the minimum predetermined data rate can be the data rate necessary for basic control signaling (such as access requests and grants). Since such a base site 10 can typically transmit with greater power (and often via use of one or more relatively tall and well-placed antenna platforms) than a typical remote unit, the transmit range of such a base site will usually be greater than the effective receive range 11 of the base site. To illustrate, a given base site 10 may have no difficulty in transmitting information to both proximally located remote units (such as transmitter A 12) and to more distally located remote units (such as transmitter B 13). This same base site 10, however, may not be able to reliably receive transmissions as sourced by the more distally located transmitter B 13, as that transmitter is located beyond the effective reception range 11 of the base site 10. Repeaters can be used to extend this effective reception range 11 as is well understood by those skilled in the art. Such range extension, however, is not an essential point of these embodiments. Instead, these embodiments are directed more towards supporting a desired level of quality of service for a remote unit transmitter that is already within the reception communication range 11 of the base site 10.

These embodiments presume the use of one or more wireless relays. FIG. 1 illustrates three such relays 15, 16, and 17 though more or fewer can be utilized as appropriate. Although these embodiments are preferably for relays that are in fixed locations, it should be understood that such relays can be mobile as well. These relays will typically have at least a wireless receiver capability in order to compatibly receive remote unit transmissions and/or control signaling from the base site 10. A relay may also have a wireline receiver capability to receive commands from the base site over a wireline link rather than a wireless link. Depending upon the needs of a given application, these relays can have a wireless and/or a wireline transmission capability to facilitate the provision of relayed transmissions to the base site 10 and/or an exchange of signaling with one or more of the remote units. Such wireless transmission capability can be either in-band or out-of-band with respect to the communication resources that are used by the remote units to facilitate their own transmissions (when out-of-band, this can refer to both the physical carrier itself and/or a point of temporal/subchannel/code differentiation).

As will be described below in more detail, pursuant to these embodiments, a transmitter (such as transmitter C 14) that is otherwise within reception range 11 of a given base site 10 can benefit from one or more relay resources that can essentially serve to improve reception of the signal originating from the transmitter via better propagation conditions and/or transmit power and thereby permit a higher quality of service (such as but not limited to higher data transmission rates).

Figure 2:
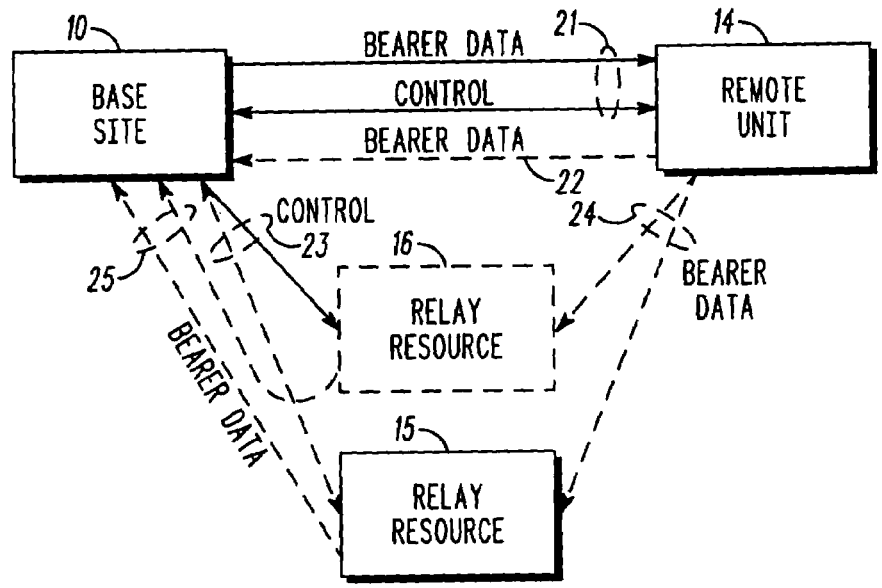
FIG. 2 comprises a block diagram illustrating various communication links as configured in accordance with various embodiments of the invention.

Prior to reviewing these embodiments in greater detail, it may first be helpful to illustrate various approaches to facilitating communications by and between relay resources. With reference to FIG. 2, as suggested above, a base site 10 will often be able to transmit directly to a given remote unit 14. These transmissions 21 can include both control information (such as resource allocation messages and the like) and bearer data (such as voice or other user data to be provided to the remote unit 14). In similar fashion, in many instances, the remote unit 14 can itself make direct transmissions 22 to the base site 10 (to provide, for example, access requests and/or bearer data). As already noted, however, in some instances, this inbound transmission link may not be of sufficient quality to permit a desired level of quality of service.

Pursuant to these embodiments, the base site 10 can also preferably transmit control information 23 to one or more relay resources (with two such relay resources 15 and 16 being shown in this illustration). Though not essential, such capability will facilitate dynamic flexibility with respect to the particular manner by which a base site 10 elects to utilize a given relay resource to effect provision of a desired level of quality of service for a given remote unit 14.

The relay resources 15 and 16 are preferably configured to compatibly receive communications, such as bearer data 24, as transmitted by a remote unit 14. Such relay resources can be configured, if desired, to always receive such communications, or to only receive specific communications as assigned, for example, by the base site 10 via corresponding control signaling. In turn, these relay resources 15 and 16 are preferably configured to relay 25 at least portions of the transmissions as received from the remote unit 14. As will be expanded upon below, a given relay resource can be configured in any of a variety of ways in this regard to suit the specific needs and requirements of a given application. For example, a given relay resource can automatically relay (either immediately or at a subsequent time) all received transmissions, or can automatically relay only those received transmissions that at least meet a predetermined (or dynamically established) reception criteria (such as received signal strength or bit error rate), or can only relay all or parts of received transmissions as may be specifically requested by, for example, the base site 10. Other possibilities also exist as will be elaborated upon below.

So configured, a base site 10 can utilize, in a variety of different ways, at least one relay resource to facilitate provision of a desired level of quality of service to support the communications of a remote unit that is already within effective reception range of the base site.

Figure 3:
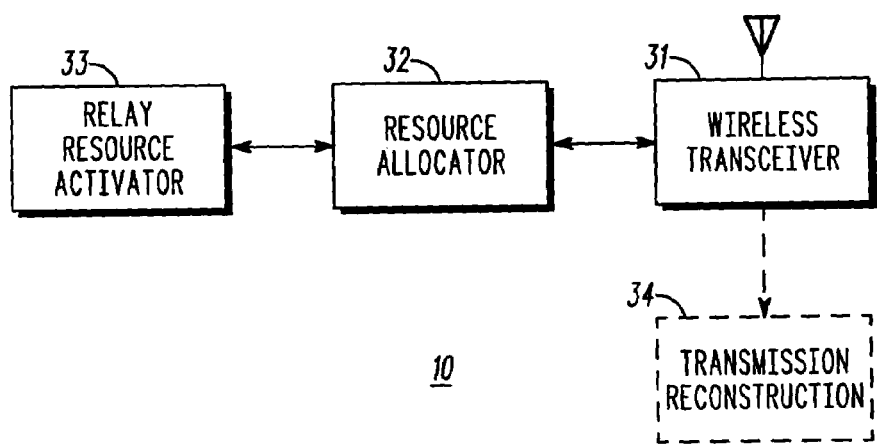
FIG. 3 comprises an illustrative block diagram of a base site as configured in accordance with various embodiments of the invention.

With reference to FIG. 3, a base site 10 will preferably include, in addition to a wireless transceiver 31 and such other communications and control support platforms as may be appropriate to a given application (not shown as such functionality and their supporting platforms are well understood in the art), a resource allocator 32 to determine when to activate a relay resource to support, for example, a requested allocation of resources to facilitate the transmission of information to the base site. Pursuant to one approach, this resource allocator 32 provides such determinations to an optional relay resource activator 33 that aids in controlling how the base site 10 will treat relayed transmissions as received at the base site 10 and/or to facilitate the provision of instructions to a given relay resource. In a preferred approach these instructions will serve to facilitate attainment of the desired quality of service level for the remote unit. As a few illustrative examples, such instructions can include, but is not limited to, any of:

an instruction regarding a particular data transmission rate to use when relaying a transmission to the base site;

an instruction regarding a particular data transmission rate to use when receiving transmissions from a given remote unit;

an instruction that identifies information regarding a particular channel to monitor to receive transmissions from a given remote unit (including information regarding the frequency of a bearer channel, a time slot (or slots), a spreading code, and the like); and an instruction that identifies information regarding a particular channel to use when relaying a transmission to the base site.

In a preferred embodiment, such a relay resource activator 33 can serve to substantially simultaneously activate a plurality of relay resources to facilitate attainment of a given level of desired quality of service as well as only a single relay resource.

So configured, in addition to such other functionality as may be desired and appropriate to a given application, the base site will include a wireless transmitter and receiver along with a resource allocator that is operably coupled to the wireless transmitter and receiver and that is responsive to a wirelessly transmitted signal from a remote unit that is within reception range of the base site and that is requesting allocation of a communication resource to facilitate transmission of information to the base site. In addition, the base site preferably includes a relay resource activator that is operably coupled to the resource allocator, such that a relay resource can be activated by the communications controller to improve quality of service for a wireless transmission from the remote unit when transmitting within reception range of the base site.

Figure 4:
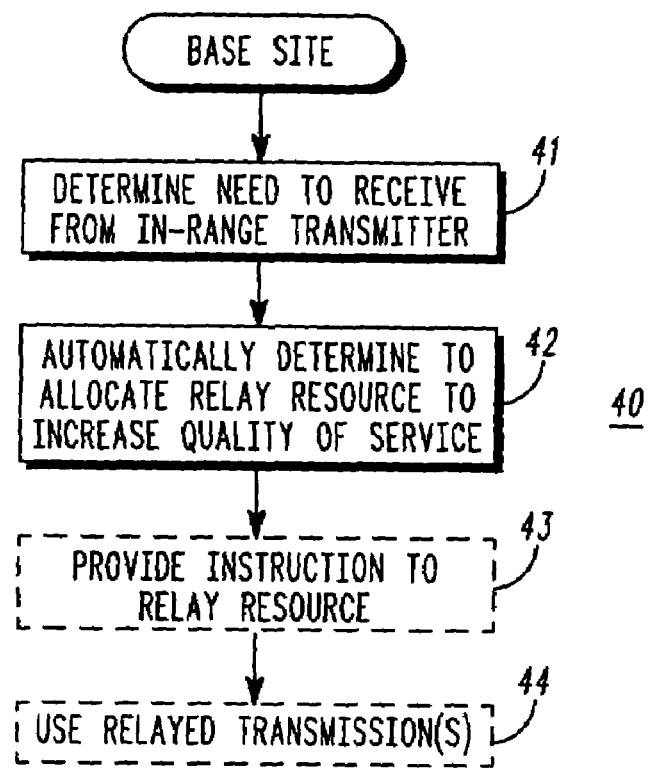
FIG. 4 comprises a base site flow diagram as configured in accordance with various embodiments of the invention.

Referring now to FIG. 4, a base site will typically determine 41 a need to receive a wireless transmission from a transmitter that is presently within communications range of the base site. For example, the base site can receive a wireless message from the transmitter that includes an indication of such a need to transmit (such a request can be communicated, for example, via a control channel).

The process 40 will then automatically determine 42 whether to allocate one or more relay resources to increase the quality of service that would otherwise be provided to support the requested transmission from the transmitter. Such a determination can include determining whether a present wireless communication path between the requesting transmitter and the base site will not likely support a given desired effective data rate. In a preferred embodiment, this determination can including using information regarding link channel quality for at least one transmission from the base site to the transmitter (as one example, the base site could consider the apparent link channel quality as pertained to reception by the base site of a message from the transmitter making requests as suggested above).

Depending upon the needs of a given application, this determination 42 can be limited to determining whether to utilize a single relay resource (either from a solitary available relay resource or from a pool of candidate relay resources as may, or may not, be available in a given system). Or, if desired, this determination 42 can include determining whether to allocate two or more relay resources to support upgraded quality of service for the communication to be facilitated by the base site. In such a case, and again depending upon the needs of a given application, the base site can allocate some but not all presently available relay resources. In a preferred embodiment, when allocating some but not all presently available relay resources, the base site will identify specific relay resources to allocate in this manner. In a simpler embodiments, all the relays can be activated simultaneously.

It is also possible, of course, that the base site could be configured to re-allocate an already-allocated relay resource to support the present communication in preference to an earlier allocation. Such a re-allocation could be based on any of a variety of decision-making criteria including, but not limited to, relative priority levels of the remote units with respect to one another, relative prioritization of the supported communication service, a change in the traffic demand, and/or any other suitable and relevant standard.

In many instances, this determination may or can include a determination to allocate a relay resource that itself utilizes at least one carrier resource (such as, for example, a particular wireless link) that is otherwise also shared by the communication system that includes the base site to effect direct communications between the base site and member communication units (for example, the relay resource may utilize such a shared carrier resource to facilitate its own relayed transmissions). In such a case, it may often be appropriate to control such allocation in order to avoid conflicts and/or communication collisions with respect to such a carrier resource. In other instances, this determination may or can include a determination to allocate a relay resource that utilizes at least one carrier resource (such as, but not limited to, a wireline link to the base site) that is not otherwise also shared by the communication system that includes the base site to effect direct communications between the base site and member communication units. In such a case, less care may be needed to ensure that resource-usage conflicts are avoided.

The nature of this determination 42 to allocate a relay resource can vary, at least in part, with respect to the kind of relay resource that is available. For example, in some embodiments, the relay resource may be configured to automatically relay all received transmissions from remote units (or at least those received transmissions that meet at least a predetermined level of signal quality). In such instances, the determination 42 to allocate the relay resource may be effected by the base site determining to accept relayed transmissions as are otherwise automatically sourced by such relay resources.

It is also possible for the nature of the relay resource to vary in other ways as may better accommodate the needs of a given application. For example, the relay resource as allocated by the base site may comprise a relatively simple waveform processing relay resource. As another illustrative example, the relay resource as allocated by the base site may comprise a demodulation processing relay resource or a demodulation and decoding processing relay resource. In the former, the relay transmits a received transmission without first decoding that transmission and while serving in either the digital or analog domain while in the latter the relay decodes the transmission and essentially relays the received transmission in a more substantive way while performing in the digital domain. Both approaches have strengths that potentially better suit the specific needs of a given system or communication requirement. The demodulation process may include the process of equalization and if needed, soft information generation such as log likelihood ratios.

When the relay resource has the ability to decode the received information from the transmitter, another potential alternative embodiment includes providing the relay resource with an ability to assess the accuracy or completeness of the received information and to make follow-on decisions or actions. For example, such a relay resource can therefore be configured to:

demodulate and decode the transmission from the transmitter to provide decoded information;

determine whether the transmission has been likely correctly received;

re-encode the decoded information to provide re-encoded information;

transmit the re-encoded information to the base site when the transmission appears to have been correctly received; and not transmit to the base site any relayed transmissions that would be based upon transmissions that were likely not correctly received.

Additional possibilities related to such capabilities are set forth further below where appropriate.

When making the determination 42 to allocate a relay resource to better support a given quality of service for a given transmitter, yet another possible embodiment includes having the base site decide whether to allocate a relay resource to support a wireless transmission from the base site to the transmitter that is presently within communications range of the base site. Such a determination can reflect and follow upon, for example, a determination that channel conditions for wireless transmissions from the base site to the transmitter are unacceptable due, at least in part, to channel characteristics (including but not limited to channel characteristics such as delay spread characteristics).

In some embodiments, the process 40 can essentially conclude with the allocation determination 42. For example, when the relay resource or resources of the system are configured to automatically relay all (or at least some) received transmissions, this determination set can conclude with the action of choosing to receive and process such automatically relayed transmissions. For other embodiments, however, the process 40 will preferably take additional actions to facilitate implementation of the determination(s) described above.

For example, in many embodiments, it may be desirable for the base site to provide 43 one or more corresponding instructions to the identified relay resource or resources. Such instructions can be provided in a variety of ways as well understood in the art. In a preferred embodiment, such instructions are provided as control signaling via a corresponding control signaling channel. Such an instruction can, for example, cause a receiving target relay resource to relay at least portions of wireless transmissions as received from a given transmitter. In addition, or in the alternative, such instructions can further provide the relay resource with:

identifying information regarding the transmitter to thereby, for example, facilitate recognition by the relay resource of transmissions from a given transmitter;

a particular transmission parameter to expect when receiving a transmission from a given transmitter (to either facilitate identification of transmissions from a particular transmitter and/or to facilitate proper reception, demodulation, decoding, or other processing by the relay resource);

a particular transmission parameter to use when relaying the transmission to, for example, the base site;

identifying information regarding a particular channel to monitor to receive the transmissions from the transmitter;

identifying information regarding a particular channel to utilize when relaying the transmission to the base site; and/or a temporal directive that pertains to subsequent relayed transmissions (for example, the base site can instruct the relay resource to utilize a communication time slot of a given carrier when relaying transmissions, which time slot is subsequent to a time slot as was assigned to the transmitter to accommodate the original transmission);

to name a few.

In some embodiments it may be desirable to support a two-way control signaling dialogue between the base site and the relay resource. For example, rather than merely having the base site provide the relay resource with a specific instruction regarding a specific data rate to use when relaying a transmission, it may be appropriate or desirable to have the relay resource negotiate a particular data rate to use when relaying a transmission to the base site. Such a negotiated data rate may, of course, be either greater or lesser than a data rate as may have been unilaterally assigned by the base site sans negotiation and hence may, at least in some settings, provide a more satisfactory level of service.

In a preferred embodiment the base site will then use 44 the relayed transmission or transmissions as provided by the one or more allocated relay resources. The nature of such usage can vary according to the needs of a given application. For example, pursuant to one approach, the base site can utilize the relayed transmissions from a single relay resource in lieu of any other source. Pursuant to another approach, the base site can receive the original transmission from the remote unit and the relayed transmission from the relay resource, compare the two received signals, and exclusively utilize whichever appears to be the better signal. Or the base site can receive the original transmission from the remote unit and the relayed transmission from the relay resource and combine the two signals using any algorithm known in the art (such as the "maximal ratio combining" algorithm). As yet another permutation of such an embodiment, the base site can receive the original transmission from the remote unit along with multiple relayed transmissions as sourced by a corresponding number of relay resources and then again select whichever signal appears to best represent the informational content for exclusive usage or combine a plurality of the received signals.

In some of the embodiments noted above, the base site essentially identifies a best transmission and then uses that transmission to the exclusion of any remaining transmissions that also represent the same substantive content. As an optional embellishment to any of these processes, the base site can request that portions of a transmission be repeated to supplement (or substitute for) an incorrectly received transmission. For example, an automatic repeat request (ARQ) process can be utilized to effect such an approach. (As is well understood in the art, ARQ typically comprises a protocol for error control in data transmissions. Generally speaking, when a receiver detects an error in a packet (using any of a number of well understood error detection techniques), the receiver automatically requests the transmitter to resend the packet.

This process can be repeated until the packet is error free or the error continues beyond a predetermined number of transmissions.)

Pursuant to one approach, the base site can transmit an appropriate ARQ message or error indicator to a transmitting remote unit and then again receive the resultant transmission or transmissions as previously described above. Pursuant to another approach, and as may be particularly appropriate when the base site relies upon transmissions from a relay resource, the base site can transmit its ARQ message or error indicator to the appropriate relay resource to thereby prompt the relay resource to repeat the corresponding transmission without also inducing the remote unit to also repeat its earlier transmission Pursuant to a relatively simplistic ARQ scheme, error-laden transmissions may be wholly discarded in favor of subsequently received transmissions. In other cases, however, at least some representation of a given transmission may be retained and then later combined with a subsequent retransmission. The representation of the given transmission may be the digitally sampled waveform, soft samples or log likelihood ratios. This process of combining the representation of a transmission with a subsequent retransmission is commonly known to those skilled in the art as Hybrid ARQ. In an optional embodiment, the base site can retain representations of transmissions from, for example, multiple sources. For example, the base site might receive an original transmission from a remote unit transmitter and a relayed version thereof from two relay resources. While each of the transmissions may have errors, the base site might nevertheless be able to combine two or more of these received transmissions to thereby yield a properly reconstructed transmission without necessitating a specific ARQ message to request a complete or partial re-transmission. In a similar fashion, the base site reconstructs as much of a given transmission as is possible using such transmissions and relayed transmissions and then uses an ARQ process as suggested earlier above to cause a repeated transmission from the remote unit transmitter and/or one or more of the relay resources to thereby attempt to correctly decode the transmission.

In the embodiments just described, the base site combines multiple transmissions to reconstruct a complete properly received message. Pursuant to another embodiment, such reconstruction can also be effected by a relay resource (either to supplement the actions of the base site or in lieu thereof). So configured, originally received and subsequently repeated transmissions can be combined as appropriate to reconstruct a correctly received transmission. Pursuant to one embodiment, the relay resource can relay the representation of the received transmission if it is unable to correctly decode the transmission. Pursuant to another embodiment, the relay resource can eschew relaying any information until a complete correctly reconstructed transmission is available to relay. Pursuant to an another embodiment, the relay may transmit a message to the base-site indicating that the information was likely not successfully decoded, for instance a negative acknowledgement message.

Figure 5:
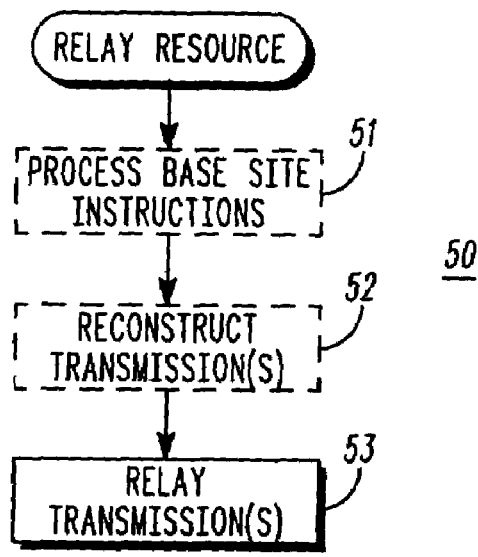
FIG. 5 comprises a relay resource flow diagram as configured in accordance with an embodiment of the invention.

As already noted earlier, a wide variety of relay resource platforms can be employed to serve the needs and requirements of these various embodiments. In some embodiments, and referring now to FIG. 5, a relay resource can optionally process 51 base site instructions (including base site instructions as set forth above and herein). Such a capability is particularly useful when the relay resource does not automatically and relatively constantly serve to simplistically repeat any and all received transmissions and/or in settings where specific details regarding how and when particular transmissions are to be received, demodulated, decoded, combined, and/or relayed are preferably provided from the base site to the relay resource. As also noted above, in some optional embodiments, it may be desirable for the relay resource to reconstruct 52 a transmission from representations of previously received multiple transmissions. In any event, an appropriate relay resource process 50 will eventually include the relaying 53 of part of all of one or more received transmissions.

In general, the base site apparatus and relay resources are sufficiently programmable and/or otherwise flexibly configurable with respect to their design and operation that such actions as those described herein for these various embodiments are readily implementable by those skilled in the art.

To aid in illustrating the flexibility and application of some of these embodiments, a number of illustrative examples will now be provided. It will be understood that these examples are not exhaustive but rather are simply indicative of the various ways in which these various embodiments can be usefully employed.

EXAMPLE 1

Figure 6:
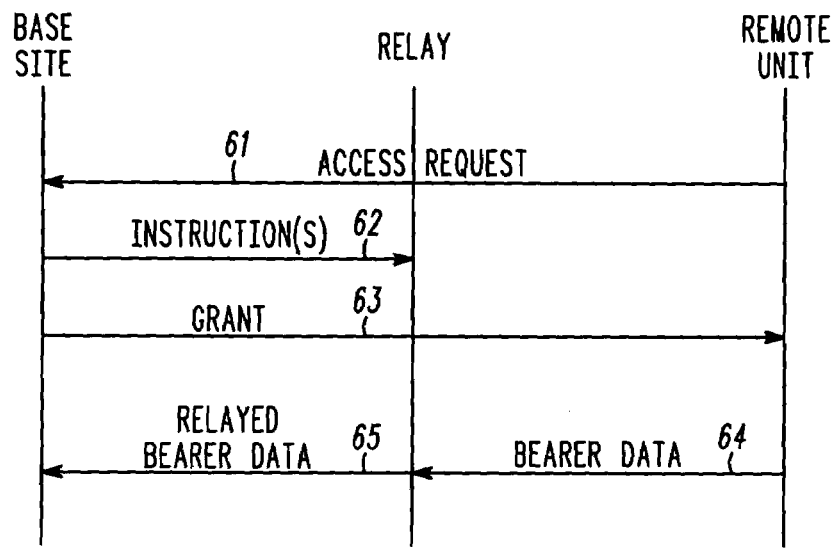
FIG. 6 comprises a timing diagram for a first example as configured in accordance with various embodiments of the invention.

Referring now to FIG. 6, a remote unit that is within reception range of a given base site transmits an access request 61. The base site determines that a relay resource should be allocated to adequately support the quality of service needs of the requested communication and provides corresponding instructions 62 to a selected relay resource. The base site then conveys a grant 63 to the remote unit containing, for example, information identifying the bearer channel and the like. The remote unit then wirelessly transmits its bearer data 64. The relay resource receives this bearer data transmission 64 and concurrently relays 65 this transmission to the base site (using, for example, a wireline pathway to the base site).

EXAMPLE 2

Figure 7:
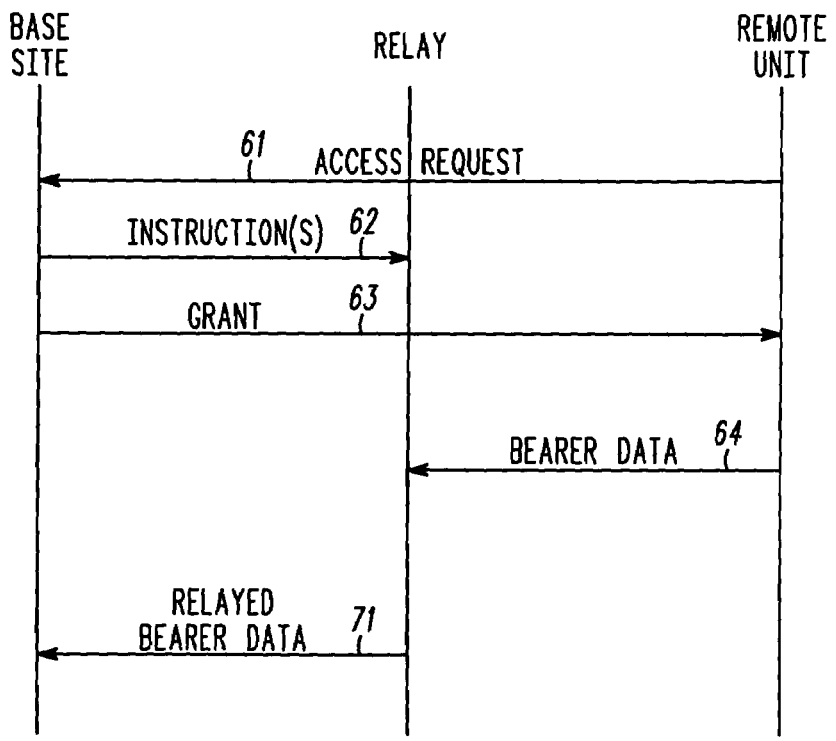
FIG. 7 comprises a timing diagram for a second example as configured in accordance with various embodiments of the invention.

Referring now to FIG. 7, the same sequence of events as was set forth in example 1 above can be repeated until reception of the bearer data transmission 64 by the relay resource. In this example, however, the relay resource does not effect a concurrent relaying of the received transmission. Instead, the relay resource effects a store-and-forward action by retaining the received information and relaying the information at a later time (using, for example, the same or another wireless bearer channel as was used by the remote unit to convey the original transmission).

EXAMPLE 3

Figure 8:
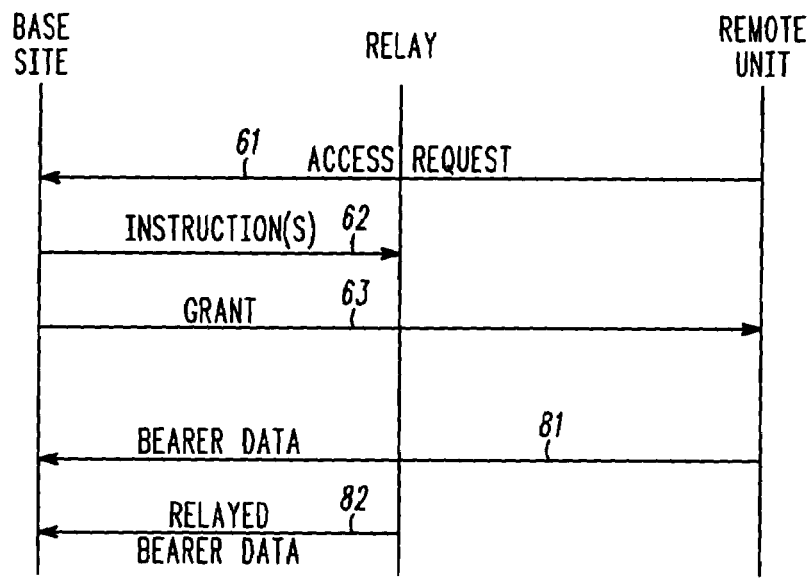
FIG. 8 comprises a timing diagram for a third example as configured in accordance with various embodiments of the invention.

Referring now to FIG. 8, the remote unit can again issue an access request 61, in response to which the base site can properly instruct 62 the relay resource and issue a corresponding grant 63 to the remote unit. In this example, the bearer data transmission 81 from the remote unit is conveyed to and received by the base site. In addition, the bearer data transmission is also received by the relay resource, which then effects a store-and-forward relaying 82 of that transmission to the base site. So configured, the base site has both transmissions to utilize in various ways as described above.

EXAMPLE 4

Figure 9:
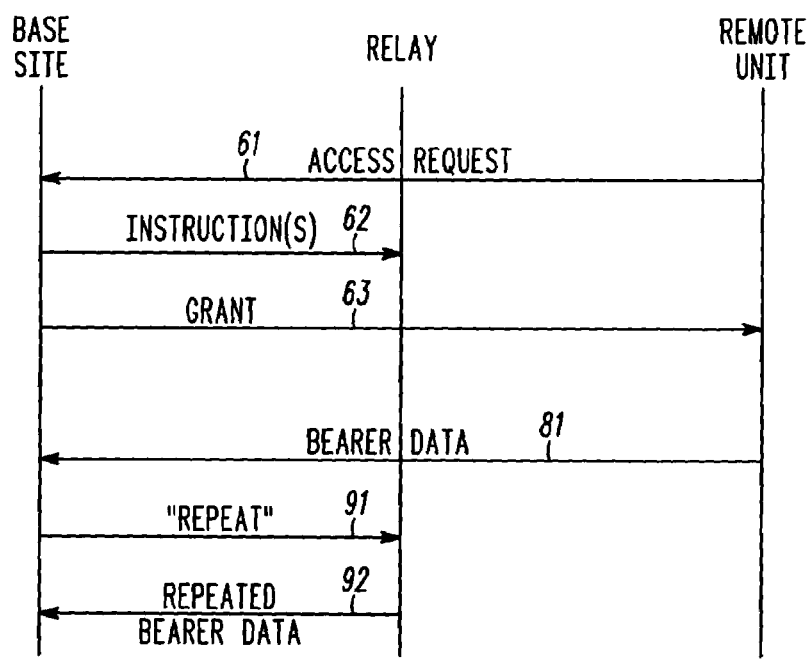
FIG. 9 comprises a timing diagram for a fourth example as configured in accordance with various embodiments of the invention.

Referring now to FIG. 9, the same series of events can transpire as described above with respect to example 3 with the exception that the relay resource does not automatically relay the received bearer data 81. Instead, the relay resource relays the bearer data 92 in response to a specific repeat request 91 as may be issued by the base site as a function, for example, of a given ARQ process.

EXAMPLE 5

Figure 10:
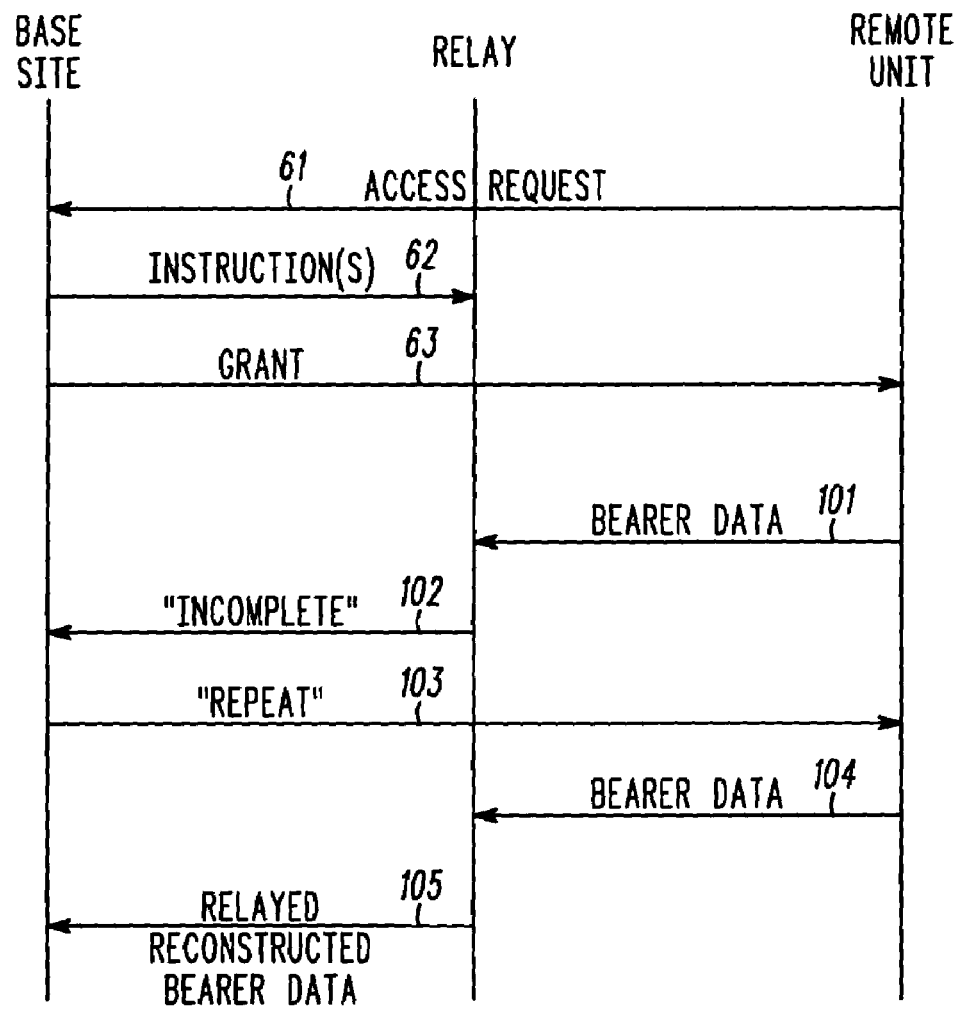
FIG. 10 comprises a timing diagram for a fifth example as configured in accordance with various embodiments of the invention.

Referring now to FIG. 10, following the grant 63, the remote unit transmits bearer data 101. The relay resource receives this bearer data 101 with evident errors. The relay resource transmits 102 to the base site to indicate the incomplete nature of the received transmission (this indication can take any of a variety of forms; for example, the indication can comprise the incomplete transmission itself and/or a signal that specifies the incomplete nature of the received transmission). The base site responds by transmitting a "repeat" instruction 103 to the remote unit (using, for example, an appropriate ARQ protocol). The remote unit responds by repeating all or part of its earlier bearer data transmission 104. In this example this second transmission is either correctly received in its entirety by the relay resource and/or enough of the second transmission is correctly received so as to permit accurate reconstruction of the complete transmission. The relay resource then relays 105 the reconstructed (or fully correctly received) bearer data to the base site. As noted earlier, when using a Hybrid ARQ protocol, the reconstructed bearer data can consist of both originally received and subsequently repeated transmissions that are combined as appropriate to reconstruct a correctly received transmission.

EXAMPLE 6

Figure 11:
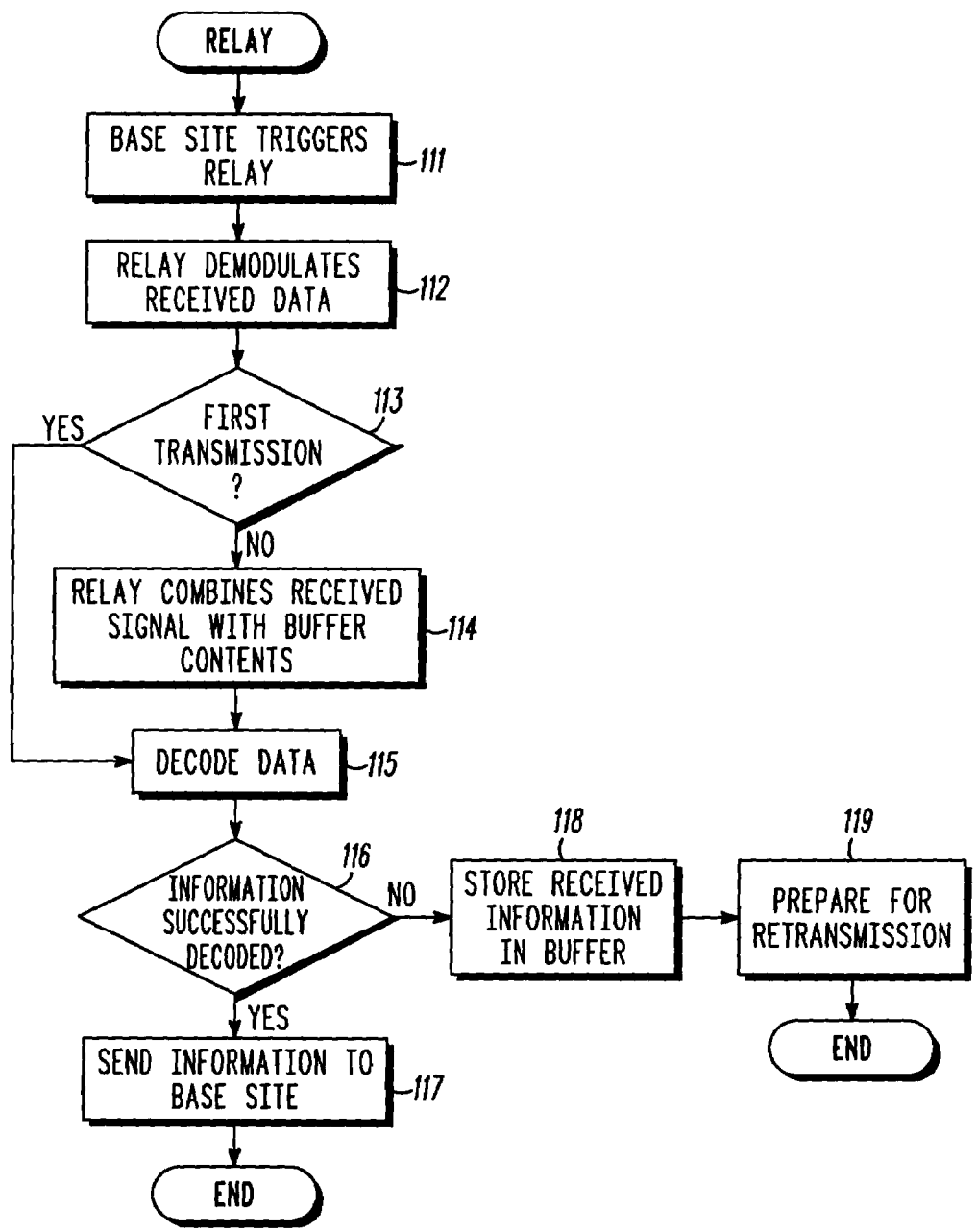
FIG. 11 comprises a flow diagram for a sixth example as configured in accordance with an embodiment of the invention.

Referring now to FIG. 11, and pursuant to this embodiment, a relay can facilitate an HARQ-based process upon being appropriately triggered 111 by a corresponding base site. This may occur at the same time that the base site schedules a transmission from a transmitter. Pursuant to this process, upon receiving a transmission the relay will demodulate 112 the received data. The demodulation process may include the process of equalization and soft information generation such as log likelihood ratios that are used in the HARQ combining and decoding process. In this particular embodiment, the relay then determines 113 whether this transmission comprises a first transmission (that is, that this transmission does not comprise a retransmission of early transmitted information). This determination can be supported in various ways. Pursuant to one embodiment, the base site can inform the relay when scheduling the transmission that the transmission indeed comprises a retransmission.

When the received transmission does constitute a first transmission, the relay decodes 115 the transmission and determines 116 whether the information was successfully decoded and, when true, forwards 117 that information to the base site. When the received transmission does not constitute a first transmission, meaning that the received transmission comprises instead a retransmission of earlier transmitted information, the relay combines 114 the recently received transmission with previously received transmission as was previously stored in a buffer. The relay then, as with a first transmission, decodes 115 the combined transmission and determines 116 whether the information has now been successfully decoded.

When not true, meaning either that an original transmission or a retransmission as combined with any previously buffered transmission has not been successfully decoded, the relay stores 118 the received transmission in a buffer so that this information will be available for use as described above should a retransmission be subsequently received. Pursuant to one embodiment, the base station may not receive any data from the relay, hence determines that the relay has likely not successfully decoded the information. The base station then sends a message to the remote unit to order the remote unit to send the next retransmission. The relay then prepares 119 to receive such a retransmission and, upon receiving such a retransmission, repeats the process set forth above. The HARQ process is thus distributed between the relay and the base station with the relay combining the retransmissions and the base site controlling the retransmissions from the remote unit. Note also that more than one relay can be involved in the HARQ process. The retransmission process is terminated as soon as at least one relay successfully decoded the information sent by the remote unit and sent back this information to the base station.

So configured it can be seen that a wide variety of embodiments and configurations are possible that all serve to facilitate the provision of a given level of increased quality of service to a transmitter that is already within reception range of a receiving station. These embodiments range from relatively simplistic configurations and actions to considerably more complicated scenarios; as such, it will be appreciated that these basic teachings are readily scalable to suit the needs and requirements of a wide variety of system challenges.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, the quality of service relays described above could be used in conjunction with range extension repeaters as may be desired and/or appropriate to a given application.

We claim:

1. A method comprising:
at a base site:
  determining a need to receive a wireless transmission from a transmitter that is presently within wireless communications range of the base site;
  automatically determining whether to selectively allocate a wireless relay resource intermediate between the base site and the transmitter to thereby at least attempt to increase a quality of service to support the wireless transmission from the transmitter, wherein the wireless relay resource comprises a demodulation processing relay resource;
  providing a grant instruction to the transmitter and the wireless relay resource comprising channel identification information and transmit parameters that are used by the transmitter to transmit and by the wireless relay resource to receive;
  providing an instruction to the wireless relay resource to cause the wireless relay resource to relay at least portions of the wireless transmission from the transmitter, wherein the instruction comprises providing at least identifying information regarding the transmitter and wherein knowledge of the wireless relay resource allocation is unnecessary for the transmitter;
  combining received portions of relayed transmissions from the wireless relay resource with portions of redundant transmissions from the transmitter to reconstruct the transmission.

2. A method comprising:
at a base site:

determining a need to receive a wireless transmission from a transmitter that is presently within wireless communications range of the base site;

automatically determining whether to selectively allocate a wireless relay resource intermediate between the base site and the transmitter to thereby at least attempt to increase a quality of service to support the wireless transmission from the transmitter, wherein the wireless relay resource comprises a demodulation processing relay resource;

providing an instruction to the transmitter to convey a wireless transmission to the base site;

providing an instruction to the wireless relay resource to cause the wireless relay resource to relay at least portions of the wireless transmission from the transmitter, wherein the instruction comprises providing at least identifying information regarding the transmitter;

wherein knowledge of the wireless relay resource allocation is unnecessary for the transmitter; and wherein automatically determining whether to selectively allocate a wireless relay resource includes automatically determining whether to allocate a wireless relay resource that will:

demodulate and decode the transmission from the transmitter to provide decoded information;

determine whether the transmission has been likely correctly received;

when the transmission is determined to have been likely correctly received, re-encode the decoded information to provide re-encoded information and transmit the re-encoded information to the base site; and not transmit to the base site any relayed transmissions that are determined to not have been likely correctly received.

3. The method of claim 2 wherein determining a need to receive a wireless transmission from a transmitter includes receiving a wireless message from the transmitter that includes an indication of a need to transmit the wireless transmission to the base site.

4. The method of claim 3 wherein receiving a wireless message from the transmitter includes receiving the wireless message, at least in part, via a control channel.

5. The method of claim 2 wherein automatically determining whether to selectively allocate a wireless relay resource to thereby at least attempt to increase a quality of service includes determining that a present wireless communication path between the transmitter and the base site will not likely support a desired effective data rate.

6. The method of claim 5 wherein determining that a present wireless communication path between the transmitter and the base site will not likely support a desired effective data rate includes using information regarding link channel quality for at least one transmission from the base site to the transmitter.

7. The method of claim 2 wherein automatically determining whether to allocate a wireless relay resource to thereby at least attempt to increase a quality of service includes automatically determining whether to allocate a plurality of wireless relay resources to thereby at least attempt to increase the quality of service.

8. The method of claim 7 and further comprising allocating selected ones of the plurality of wireless relay resources to at least attempt to increase the quality of service.

9. The method of claim 8 wherein allocating selected ones of the plurality of wireless relay resources includes allocating some but not all presently available wireless relay resources.

10. The method of claim 2 wherein automatically determining whether to selectively allocate a wireless relay resource to thereby at least attempt to increase a quality of service includes automatically determining whether to allocate a wireless relay resource that utilizes at least one carrier resource that is otherwise also shared by a communication system that includes the base site to effect direct communications between the base site and member communication units.

11. The method of claim 2 wherein automatically determining whether to selectively allocate a wireless relay resource to thereby at least attempt to increase a quality of service includes automatically determining whether to allocate a wireless relay resource that utilizes at least one carrier resource that is not otherwise also shared by a communication system that includes the base site to effect direct communications between the base site and member communication units.

12. The method of claim 2 wherein providing an instruction to the wireless relay resource includes providing the instruction via a control channel.

13. The method of claim 12 wherein providing the instruction via a control channel includes providing the instruction via a control channel that is also used to exchange at least some control information between the base site and the transmitter.

14. The method of claim 2 wherein providing an instruction includes providing at least one of:
a particular transmission parameter to expect when receiving the transmission from the transmitter;
a particular transmission parameter to use when relaying the transmission;
identifying information regarding a particular channel to monitor to receive the transmission from the transmitter;
identifying information regarding a particular channel to utilize when relaying the transmission to the base site.

15. The method of claim 2 and further comprising:
using relayed transmissions from a plurality of relay resources to receive the transmission from the transmitter.

16. The method of claim 15 wherein using relayed transmissions from a plurality of relay resources includes receiving, on a same time-frequency channel, portions of the relayed transmissions from various of the plurality of relay resources to reconstruct the transmission.

17. The method of claim 16 wherein receiving, on a same time-frequency channel, portions of the relayed transmissions from various of the plurality of relay resources to reconstruct the transmission includes decoding received portions of the relayed transmissions from various of the plurality of relay resources to reconstruct the transmission.

18. A method comprising:
at a base site:
determining a need to receive a wireless transmission from a transmitter that is presently within wireless communications range of the base site;
automatically determining whether to selectively allocate a wireless relay resource intermediate between the base site and the transmitter to thereby at least attempt to increase a quality of service to support the wireless transmission from the transmitter, wherein the wireless relay resource comprises a demodulation processing relay resource;
providing an instruction to the transmitter to convey a wireless transmission to the base site;
providing an instruction to the wireless relay resource to cause the wireless relay resource to relay at least portions of the wireless transmission from the transmitter, wherein the instruction comprises providing at least identifying information regarding the transmitter;
wherein knowledge of the wireless relay resource allocation is unnecessary for the transmitter; and
at a wireless relay resource:
combining received portions of relayed transmissions from the transmitter using hybrid automatic repeat request to reconstruct the transmission.

19. The method of claim 18 wherein combining received portions of relayed transmissions from the transmitter using hybrid automatic repeat request to reconstruct the transmission includes combining and decoding received portions of relayed transmissions from the transmitter to reconstruct the transmission.

20. The method of claim 18 and further comprising, at the wireless relay resource, relaying a reconstructed transmission to the base site.

21. The method of claim 1 wherein combining received portions of relayed transmissions from the wireless relay resource with portions of transmissions from the transmitter to reconstruct the transmission includes comprising combining received portions of relayed transmissions from at least one wireless relay resource with previously stored portions of transmissions from the transmitter to reconstruct the transmission.

22. The method of claim 2 wherein automatically determining whether to allocate a wireless relay resource includes automatically determining whether to allocate a wireless relay resource that comprises a demodulation and decoding processing relay resource.

23. The method of claim 2 and further comprising negotiating a data rate for the transmitter to utilize when transmitting the transmission.

24. The method of claim 2 wherein determining a need to receive a wireless transmission includes determining a need to receive a wireless transmission comprising bearer data and not system control information that corresponds to resource allocation.

25. The method of claim 2 and further comprising allocating a communication resource to the relay resource.

26. The method of claim 25 wherein allocating a communication resource to the relay resource includes providing a relayed transmission temporal directive that is subsequent to a temporal directive as is assigned to the transmitter to support the transmission from the transmitter.

27. The method of claim 26 wherein providing a relayed transmission temporal directive that is subsequent to a temporal directive includes allocating a time slot to support the relayed transmission that is subsequent to a time slot as is assigned to the transmitter for the transmission.

28. The method of claim 2 and further comprising automatically determining whether to allocate a wireless relay resource to thereby at least attempt to increase a quality of service to support a wireless transmission from the base site to the transmitter that is presently within communications range of the base site.

29. The method of claim 28 wherein automatically determining whether to allocate a wireless relay resource to thereby at least attempt to increase a quality of service to support a wireless transmission from the base site to the transmitter that is presently within communications range of the base site includes automatically determining whether to allocate a wireless relay resource to thereby at least attempt to increase a quality of service to support a wireless transmission from the base site to the transmitter that is presently within communications range of the base site but channel conditions for wireless transmissions from the base site to the transmitter are determined to be unacceptable due, at least in part, to channel characteristics.

30. The method of claim 29 wherein the channel characteristics comprise delay spread characteristics.

31. The method of claim 2 and further comprising allocating a wireless relay resource that couples via a wireless link to the base site.

32. The method of claim 2 and further comprising allocating a wireless relay resource that couples via a wireline link to the base site.

33. A communications controller configured to operate at a base site and comprising:
a wireless transmitter and receiver;
a resource allocator that is operably coupled to the wireless transmitter and receiver and that is responsive to a wirelessly transmitted signal from a remote unit that is within wireless reception range of the receiver requesting allocation of a communication resource to facilitate transmission of information to the receiver;
a relay resource activator that is operably coupled to the resource allocator, such that a wireless relay resource intermediate between the base site and the remote unit and having a demodulation processing relay resource can be selectively activated by the communications controller to improve quality of service for a wireless transmission from the remote unit when transmitting within reception range of the receiver and provides an instruction to the relay resource to cause the relay resource to relay at least portion of the wireless transmission from the remote unit, wherein the instruction comprises providing at least identifying information regarding the remote unit;
a means for providing a grant instruction to the remote unit and the wireless relay resource comprising channel identification information and transmit parameters that are used by the remote unit to transmit and by the wireless relay resource to receive, wherein knowledge of the wireless relay resource allocation is unnecessary for the transmitter; and
a means for combining received portions of relayed transmissions from the wireless relay resource with portions of redundant transmissions from the transmitter to reconstruct the transmission.

34. The communications controller of claim 33 wherein the resource allocator includes means for determining when to activate a relay resource to support a requested allocation of resources to facilitate the transmission of information to the receiver.

35. The communications controller of claim 33 wherein the relay resource activator includes means for providing instructions to a given relay resource comprising at least one of:
a particular data transmission rate to expect when receiving the transmission from the remote unit;
a particular data transmission rate to use when relaying the transmission to the receiver;
identifying information regarding a particular channel to monitor to receive the transmission from the remote unit;
identifying information regarding a particular channel to utilize when relaying the transmission to the receiver.

36. The communications controller of claim 33 wherein the relay resource activator includes means for substantially simultaneously activating a plurality of relay resources to improve the quality of service for the wireless transmission from the remote unit.

37. The communications controller of claim 36 and further comprising reception means for receiving relayed transmissions from the plurality of relay resources and for reconstructing the wireless transmission from the remote unit by combining relayed transmissions from at least two of the plurality of relay resources.

38. The method of claim 2 and further comprising, in response to providing the instructions to the transmitter and the wireless relay resource, operating, by the transmitter, independent of the instructions provided to the wireless relay resource.

39. The method of claim 2 and further comprising, in response to providing the instructions to the transmitter and the wireless relay resource, conveying all control information to the transmitter independent of the allocated wireless relay resource.

40. A wireless communication system comprising:
- a wireless relay resource that is configured to combine received portions of relayed transmissions from the transmitter using hybrid automatic repeat request to reconstruct the transmission
- a base site comprising: a resource allocator that is configured to determine a need to receive a wireless transmission from the transmitter, wherein the transmitter is presently within wireless communications range of the base site, and automatically determine whether to selectively allocate the wireless relay resource intermediate between the base site and the transmitter to thereby at least attempt to increase a quality of service to support the wireless transmission from the transmitter, wherein the wireless relay resource comprises a demodulation processing relay resource; and
- a relay resource activator that is configured to provide an instruction to the transmitter to convey a wireless transmission to the base site, and provide an instruction to the wireless relay resource to cause the wireless relay resource to relay at least portions of the wireless transmission from the transmitter, wherein the instruction comprises providing at least identifying information regarding the transmitter, and wherein knowledge of the wireless relay resource allocation is unnecessary for the transmitter.

* * * * *